No. 627,617. Patented June 27, 1899.
F. HURLBUT.
DENTAL SPITTOON.
(Application filed Mar. 26, 1898.)
(No Model.)
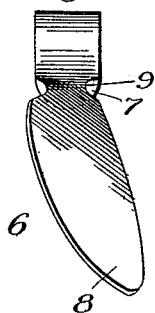
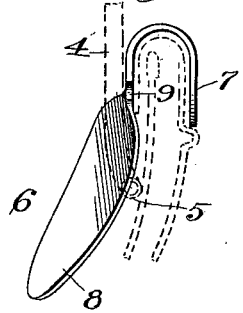
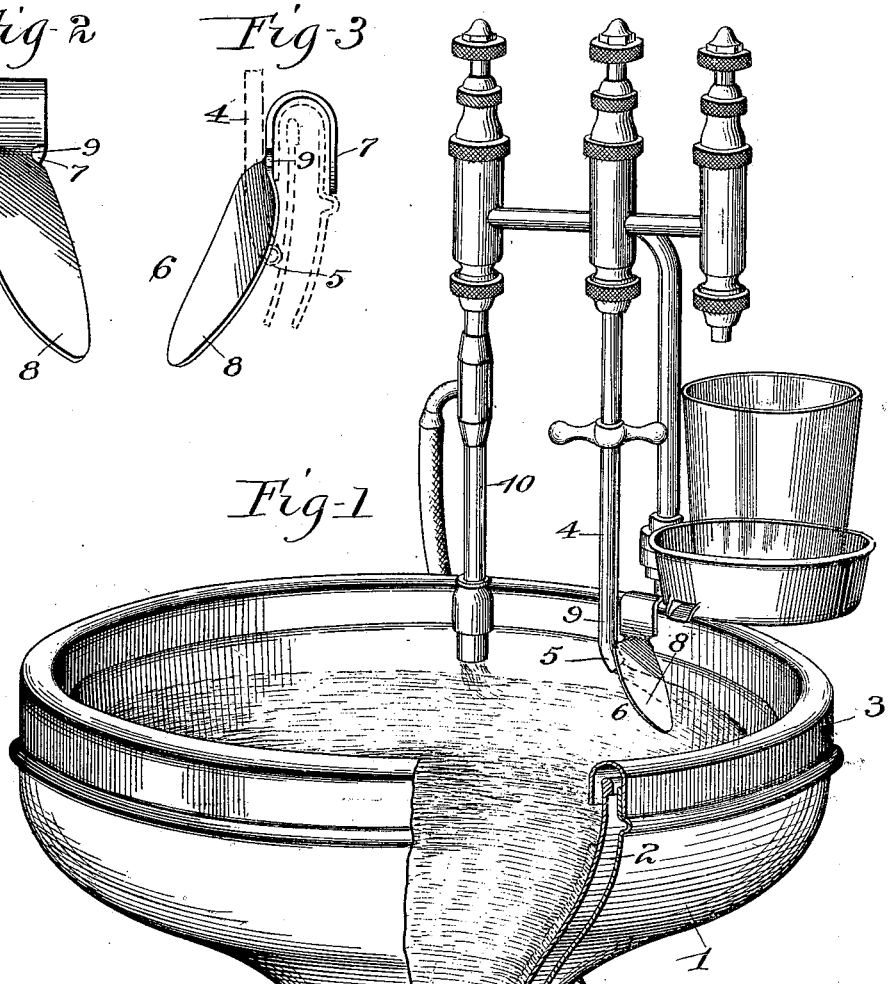
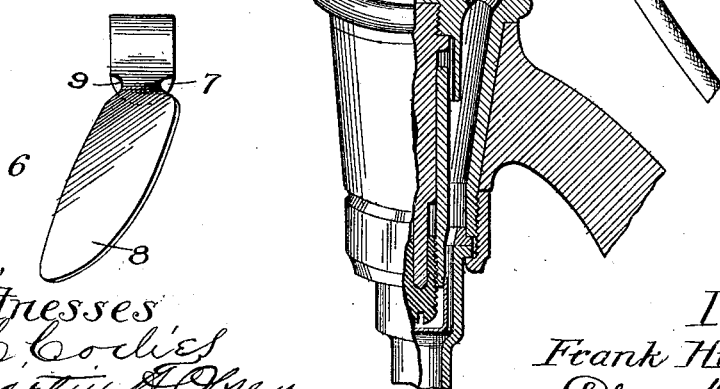

UNITED STATES PATENT OFFICE.

FRANK HURLBUT, OF CHICAGO, ILLINOIS.

DENTAL SPITTOON.

SPECIFICATION forming part of Letters Patent No. 627,617, dated June 27, 1899.

Application filed March 26, 1898. Serial No. 675,232. (No model.)

*To all whom it may concern:*

Be it known that I, FRANK HURLBUT, residing at Chicago, in the county of Cook and State of Illinois, have invented certain new and useful Improvements in Dental Spittoons, of which the following is a specification.

My invention has relation to dental spittoons; and its object is to provide means to prevent splashing of water from the water-injector or other supply-pipe and also to secure proper action of the water upon the inner bowl of the spittoon. My invention has particular application to those spittoons in which an inner revoluble bowl is used, which is adapted to be caused to be rotated by a jet of water from a suitable supply-pipe. In such devices the water is not only liable to spurt and splash, but in case of the rapid rotation of the bowl the water is liable to be carried around on the upper inner face of the bowl and accumulate there. My invention is designed to obviate these objections and to provide a dental spittoon embodying novel and advantageous features.

In the drawings, Figure 1 is an elevation of a dental spittoon with a portion thereof broken away and showing my device as an attachment in position adjacent to the discharge end of the water-injector or other supply-pipe;
Figs. 2 and 3, detail views showing the attachment in different positions to illustrate its form, and Fig. 4 a detail view of a similar attachment used when the injector is pointed in a direction opposite to that shown in Fig. 1.

My device may be formed integral with the spittoon construction, and while I have shown it in the drawings and will hereinafter for convenience describe it as an attachment it will be understood that I do not limit myself in that respect.

The dental spittoon comprises, preferably, as shown, an outer bowl 1, within which is an inner revoluble bowl 2, over which is placed a preferably removable circular cap 3. While the inner bowl is shown in the drawings as designed to be rotated by the water-injector, my invention is not limited thereto. The water-supply pipe 4, having a nozzle 5, as shown, acts as an injector; but my device is adapted to work with any suitable water-supply pipe. This injector is preferably rotatable, so as to be shifted to direct water in one direction or the other, as desired.

My device (shown herein as an attachment) comprises a strip 6 of suitable material, preferably thin sheet metal, and is formed in the shape shown particularly in Figs. 2 and 3. One end of the strip is bent to form a hooked portion 7, which is adapted to engage over the edge of the bowl or the top of the cap and hold the device in place, as shown in Figs. 1 and 3. The body portion of the strip is in the form of a curved and preferably tapered blade 8, which is bent at the throat 9. This device is adapted to be placed adjacent to the nozzle 5 and slightly in advance thereof, so that the water strikes the bowl behind the blade. The blade is so curved, as shown, that when in position one edge will be closer to the bowl than the other and the injector or other supply-pipe will be somewhat behind the blade. The water is thus prevented from splashing, and at the same time the edge of the blade, which is close to the inner surface of the bowl, prevents any accumulation of water and distributes and keeps the water in a thin sheet or bed, thereby insuring perfection in the operation of the spittoon as a whole.

The saliva-ejector pipe 10 and the other parts of the device not herein specifically referred to form no part of my invention and need not be described.

Inasmuch as the water-supply pipe is adapted to be shifted so as to direct water in the opposite direction an attachment or device in which the blade is oppositely curved is required and must be placed to the left of the pipe, Fig. 1; but the operation and advantageous results are the same in both instances. In Fig. 4 I have shown such an attachment.

While I have shown and described my device as an attachment, it will be understood that it may be made in that form as a new article of manufacture or as an integral part of the spittoon without departing from the spirit of my invention or the scope of my claims, and, furthermore, while the inner bowl is shown and described as revoluble it is understood that my invention is applicable to a stationary or non-revoluble bowl and that the same purpose of preventing spurting of water and its accumulation on the inner surface of the bowl may be thereby subserved.

Although I have described more or less precise forms and details of construction, I do not wish to be understood as limiting myself thereto, as I contemplate changes in form, the proportion of parts, and the substitution of equivalents as circumstances may suggest or render expedient and without departing from the spirit of my invention.

I claim—

1. In a dental spittoon, the combination with the bowl, of a water-supply pipe for supplying water to the bowl and a blade depending obliquely from the top of the bowl and curved to present one edge in close proximity to the inner surface of the bowl and the other edge away therefrom.

2. In a dental spittoon, the combination with the bowl, of a water-supply pipe for supplying water to the bowl and a blade secured to the bowl adjacent to the end of the supply-pipe and extending obliquely downward and forward in advance of the place of contact of the water, such blade presenting one of its edges in close proximity to the inner surface of the bowl and the other away therefrom.

3. In a dental spittoon, the combination with the bowl, of a water-supply pipe for supplying water to the bowl and a curved twisted blade secured to the top edge of the bowl and depending downwardly and forwardly in advance of the place of contact of the water, such blade being curved to present one of its edges in close proximity to the inner surface of the bowl and the other away therefrom.

4. In a dental spittoon, the combination, with the bowl, of a water-supply pipe for supplying the bowl with water and a curved blade located adjacent to the end of the supply-pipe and having one of its edges arranged in close proximity to the inner surface of the bowl, and its other edge away therefrom.

5. In a dental spittoon, the combination with the bowl, of means for supplying water thereto and a device for preventing the accumulation of water upon the inner surface of the bowl comprising a hook portion 7 adapted to engage over the top edge of the bowl, a tapered and curved blade portion 8 depending obliquely and a throat portion 9, intermediate of said portions 7 and 8, the blade being curved to present one edge in close proximity to the inner surface of the bowl and the other edge away therefrom.

6. In a dental spittoon, the combination, with the bowl, of a water-supply pipe for supplying the bowl with water and a device having a hook portion at one end adapted to engage the rim of the bowl and a blade portion depending in proximity to the end of the supply-pipe and to the inner surface of the bowl, and having its other edge away from the surface of the bowl and toward the center thereof.

7. In a dental spittoon, the combination, with the bowl, of a supply-pipe 4 having a nozzle 5, a device having a hook portion 7 adapted to engage over the top edge of the bowl and also having a blade portion 8 depending adjacent to the nozzle of the water-supply pipe.

8. In a dental spittoon, the combination with the bowl, of a water-supply therefor and means for preventing the accumulation of water upon the sides of the bowl, and thereby providing a thin sheet of water thereupon, comprising a depending blade having one edge near the side of the bowl and the other away therefrom.

9. A dental spittoon comprising an outer stationary bowl and an inner revoluble bowl, a water-jet for supplying water to the inner bowl and for rotating the same, and a stationary blade arranged in close proximity to the inner surface of the inner bowl for preventing the accumulation of water on such inner surface due to the rotation of such inner bowl.

10. A dental spittoon comprising an outer stationary bowl and an inner revoluble bowl, a cap arranged over the top edges of the bowls, means for supplying water to the bowl and for rotating the same, and a blade depending from said cap and having one of its edges arranged in close proximity to the inner surface of the inner bowl whereby the accumulation of water on such inner surface, due to the rotation of the inner bowl, is prevented.

11. In a dental spittoon, a rotary bowl adapted and arranged for continuous rotation, means for maintaining a jet of water for rotating the said bowl and a blade or governor adapted and arranged to regulate the rotation of the bowl with respect to variations in the water-pressure; the said blade or governor consisting of a fixed or stationary projection arranged to extend a suitable distance within the rotary bowl, and serving as a brake to retard the rotary or swirling movement of the water within the bowl, upon an increase of water-pressure.

12. In a dental spittoon, a rotary bowl adapted and arranged for continuous rotation, means for maintaining a jet of water for rotating the bowl, a rim or guard arranged above the perimeter of the bowl, and a blade or projection fixed or secured to the said rim or guard and extending a suitable distance into the hollow of the bowl; the said blade or projection serving to retard the rotary or swirling movement of the water, upon an increase of water-pressure, and to thereby govern the rotation of the bowl with respect to such variations in the water-pressure.

FRANK HURLBUT.

Witnesses:
J. A. BURNAP,
L. E. SERAGE.